Jan. 16, 1962     O. WITTEL ETAL     3,016,620
FOOTAGE INDICATOR MECHANISM
Filed June 13, 1958
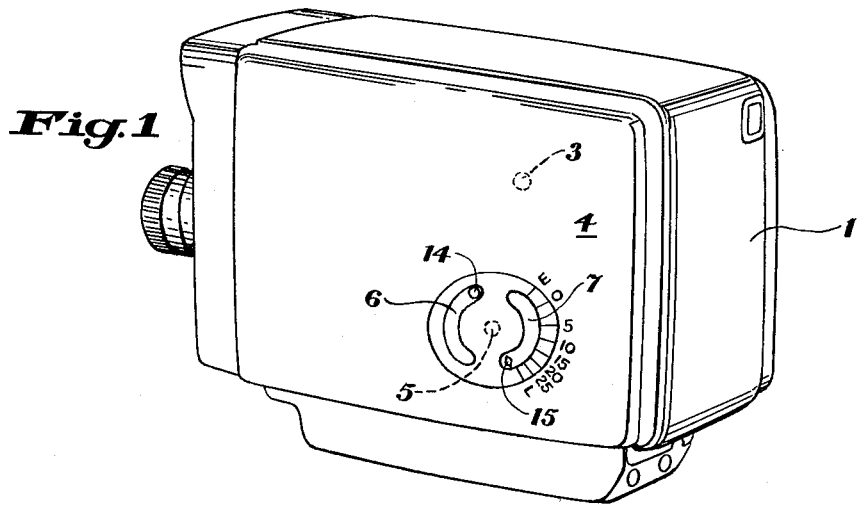
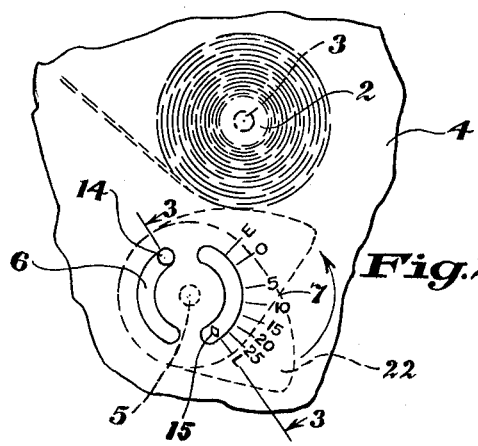
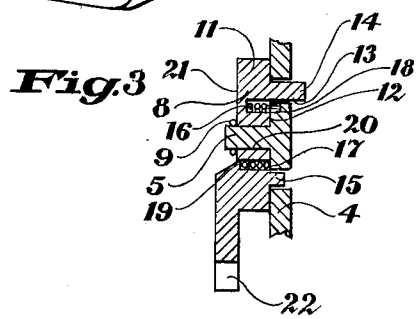
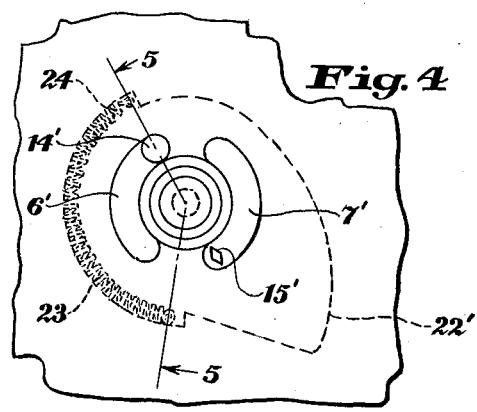
Otto Wittel
John L. Salzer
INVENTORS
BY R. Frank Smith
Steve W. Grembow
ATTORNEYS

3,016,620
FOOTAGE INDICATOR MECHANISM

Otto Wittel and John L. Salzer, Rochester, N.Y., assignors to Eastman Kodak Company, Rochester, N.Y., a corporation of New Jersey
Filed June 13, 1958, Ser. No. 741,967
4 Claims. (Cl. 33—172)

This invention relates generally to photography, and more specifically to a footage indicator mechanism for a roll-film camera.

Film footage indicators for indicating the amount of film still available for exposure have been used in the photographic industry for years. The film footage mechanisms developed heretofore are designed to be continuously operative to constantly indicate to an operator, even when the photographic equipment in which the film footage mechanism is embodied is inoperative or idle, the amount of film still available for exposure. Accordingly, these mechanisms are normally of complicated design containing a considerable number of working parts which greatly increases the cost of the mechanisms, reduces their reliability, and enhances the likelihood of mechanical failure therein. A further disadvantage of these prior art mechanisms is that the parts thereof are subject to wear and fatigue failure since the mechanisms are operating continuously.

One of the primary objects of this invention, therefore, is to provide a film footage indicator for a camera that is of extremely simple design and construction, thoroughly reliable and efficient in operation, and economical to manufacture.

Another object of this invention is to provide a film footage indicator constructed of very few parts thereby greatly reducing the cost of the mechanism and the need for maintenance and repair.

Still another object of this invention is the provision of an improved film footage indicator mechanism that is adapted to be operated intermittently by the operator to indicate the amount of film still available for exposure, thereby greatly increasing the life expectancy of the mechanism.

Objects and advantages other than those set forth above will be apparent from the following description when read in connection with the accompanying drawing, in which:

FIG. 1 is a perspective view of a camera embodying the invention;

FIG. 2 is a fragmentary elevation view of a portion of the camera shown in FIG. 1;

FIG. 3 is a section view taken along line 3—3 of FIG. 2;

FIG. 4 is a view similar to FIG. 2 showing a modificatio of the invention; and

FIG. 5 is a section view taken along line 5—5 of FIG. 4.

As shown in the drawing, a preferred embodiment of this invention is illustrated as applied to a camera 1 having a film supply spool 2 mounted on a spindle 3 carried by the camera. The camera 1 has a wall 4 forming part of the camera body and provided with a stud 5 and a pair of arcuate slots 6, 7 adjacent the film supply spool 2. A graduated scale is disposed on the camera wall adjacent the slot 7 for indicating the amount of film still available on the supply spool 2 for exposure.

The film footage indicator mechanism comprises a unitary film contacting member 8 rotatably mounted on the stud 5 and retained thereon by means of a push-on retainer element 9 as best seen in FIG. 3. The member 8 has a cylindrical portion 11, and the side 12 thereof bearing upon the camera wall 4 is provided with a finger 13 parallel to the stud 5 and extending through the slot 6 with its end protruding therefrom to form an operating element in the form of a button 14 by which the member 8 may be turned about the stud 5. The button 14 is normally provided with a knurled surface to facilitate movement of the button 14 and member 8 by the operator's finger. The member 8 carries indicating means preferably in the form of another projection 15 extending from the side 12 parallel to said stud 5 and finger 13 and partially extending into the other slot 7, the length of the projection 15 being slightly less than the width of the camera wall 4. The projection 15 is diamond-shaped to form a pointer adapted to cooperate with the scale to indicate the film footage remaining on the film supply spool 2. The member 8 further has an annular groove 16 concentric with its base 20, and a helical torsion spring 17 is disposed in the groove 16 with one end of the spring 17 anchored in a slot 18 formed by the camera wall 4, and the other end disposed in a slot 19 formed in the member 8. The spring 17 in its assembled position is partially under tension tending to bias the member 8 in a clockwise direction urging the finger 13 against the end of the slot 6 which serves as a stop member. The other side 21 of the member 8 has a disk-like cam 22 substantially parallel to the camera wall 4 and adapted when the member 8 is turned against the bias of the spring 17 by means of the button 14 to engage the periphery of the roll of film carried by the supply spool 2 as shown dotted in FIG. 2.

In another embodiment of the invention as disclosed in FIGS. 4 and 5, the parts thereof that are similar to corresponding parts of the indicator mechanism disclosed in FIGS. 1 through 3 are designated by the same numerals primed. In this embodiment, the annular groove 16 is eliminated, and the cylindrical portion 11' of the member 8' is provided with an arcuate peripheral lip 23. A helical tension spring 24 as shown dotted in FIG. 4 is wrapped around a seat 25 formed by the cylindrical portion 16' and lip 23 with one end of the spring 24 secured to a pin 26 formed by the camera wall 4', and the other end mounted on a lug 27 formed by the lip 23.

In the operation of this invention, any time that the operator desires to know the amount of film still available on the film supply spool 2 for exposure, he merely places a finger on the button 14 and manually urges the button in a counterclockwise direction against the bias of the spring 16 or 24 depending upon which modification of the invention is used until the cam 22 engages the periphery of the film supply spool 2. The amount of unexposed film still remaining on the film spool 2 is indicated on the scale opposite the pointer 15. Having noted the amount of film still remaining on the spool 2, the operator merely releases the button 14 whereupon the respective spring 17, 24 urges the member 8 in a clockwise direction until the finger 14 engages the end of the slot 6. In this position the cam 22 is completely clear of the film convolutions on the spool 2.

The invention has been described in detail with particular reference to preferred embodiments thereof, but it will be understood that variations and modifications can be effected within the spirit and scope of the invention as described hereinabove and as defined in the appended claims.

We claim:

1. A film supply indicator for a camera of the type adapted to receive a supply spool of film within the camera body, comprising a camera body portion having a pair of slots therein, a film contacting member pivotally mounted on said body intermediate such slots and adapted to be moved into engagement with the periphery of film wound on said spool, biasing means normally urging said film contacting member away from such engagement, an operating element provided by said film contacting member and accessible through one of said slots for manual actuation from the exterior of the camera body to move said film contacting member in opposition to said biasing means into contact with the periphery of the film on the spool, and indicating means provided by said film contacting member and extending into the other of said slots and visible therein from the exterior of the camera body to indicate by its position in said other slot the amount of film on said supply spool when said film contacting member is moved into contact with the film.

2. In a film footage indicator for a camera adapted to contain a film supply spool, the combination of: a stud on a wall of said camera, said wall provided with a pair of arcuate slots concentric with the axis of said stud; a unitary member pivotally mounted on said stud; a finger extending from one side of said member parallel to said stud axis and received by one of said slots, said finger extending beyond said wall to form a button; a pointer extending from said one side of said member parallel to said finger and received by the other of said slots; a graduated film footage scale on said camera wall adjacent the said other of said slots and cooperating with said pointer to give a film footage indication; a cam element formed by said unitary member extending transversely of said stud axis and adapted to engage the periphery of a roll of film carried by said film supply spool when said member is turned by said button; and a spring carried by said member and having one end connected to said camera wall and the other end connected to said member for biasing said member in a direction to withdraw said cam element from said roll of film.

3. In a film footage indicator for a camera adapted to contain a film supply spool, the combination of: a stud on a wall of said camera, said wall provided with a pair of arcuate slots concentric with the axis of said stud; a unitary member pivotally mounted on said stud; a finger extending from one side of said member parallel to said stud axis and received by one of said slots, said finger extending beyond said wall to form a button; a pointer extending from said one side of said member parallel to said finger and received by the other of said slots; a graduated film footage scale on said camera wall adjacent the said other of said slots and cooperating with said pointer to give a film footage indication; a cam element formed by said unitary member extending tranversely of said stud axis and adapted to engage the periphery of a roll of film carried by said film supply spool when said member is turned by said button, said unitary member further forming an annular recess concentric with said stud axis; and a helical spring disposed in said recess having one end connected to said camera wall and the other end connected to said member for biasing said member in a direction withdrawing said cam element from said roll of film.

4. In a film footage indicator for a camera adapted to contain a film supply spool, the combination of: a stud on a wall of said camera, said wall provided with a pair of arcuate slots concentric with the axis of said stud; a unitary member pivotally mounted on said sutd; a finger extending from one side of said member parallel to said stud axis and received by one of said slots, said finger extending beyond said wall to form a button; a pointer extending from said one side of said member parallel to said finger and received by the other of said slots; a graduated film footage scale on said camera wall adjacent the said other of said slots and cooperating with said pointer to give a film footage indication; a cam element formed by said unitary member extending transversely of said stud axis and adapted to engage the periphery of a roll of film carried by said film supply spool when said member is turned by said button, said unitary member further forming an arcuate peripheral lip; and a helical spring disposed around a portion of said member adjacent said lip and having one end connected to said camera wall and the other end connected to said lip for biasing said member in a direction withdrawing said cam element from said roll of film.

References Cited in the file of this patent
UNITED STATES PATENTS

| | | |
|---|---|---|
| 1,926,703 | Spence | Sept. 12, 1933 |
| 1,992,394 | Roe | Feb. 26, 1935 |
| 2,124,883 | Martin | July 26, 1938 |